Patented Mar. 12, 1935

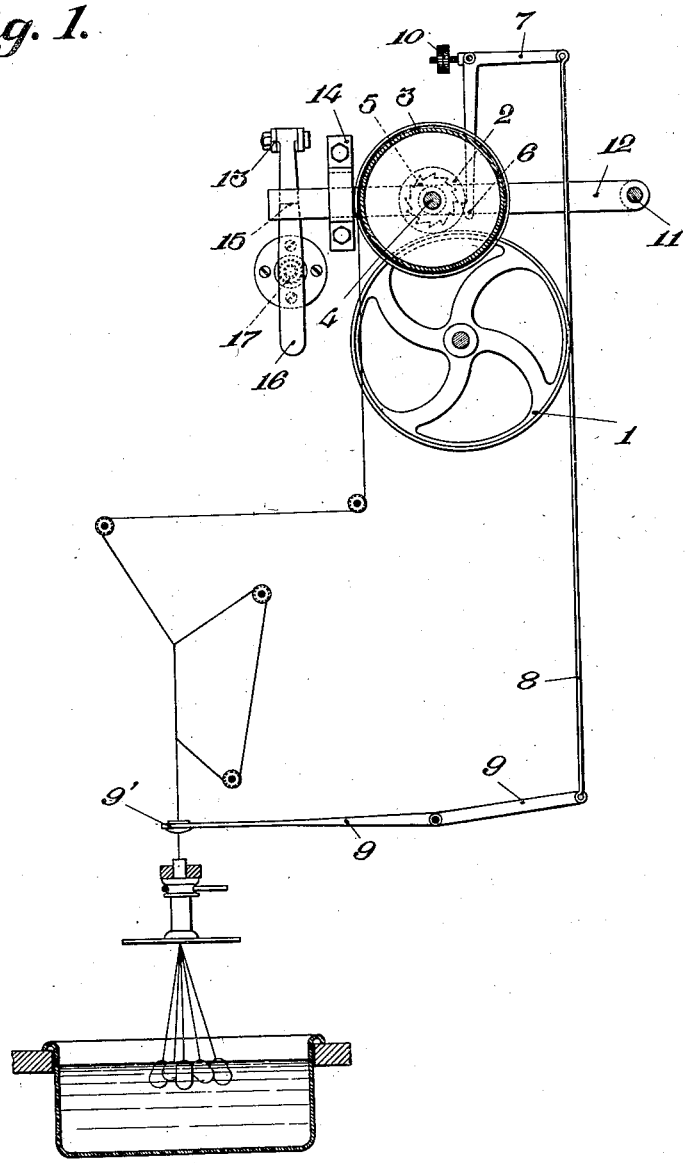

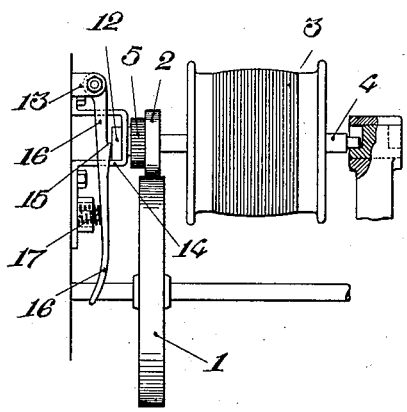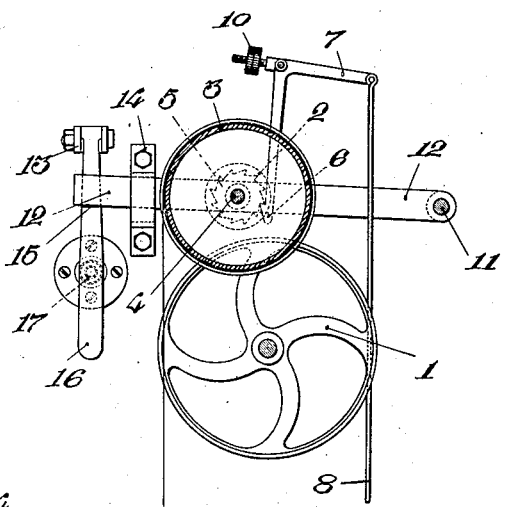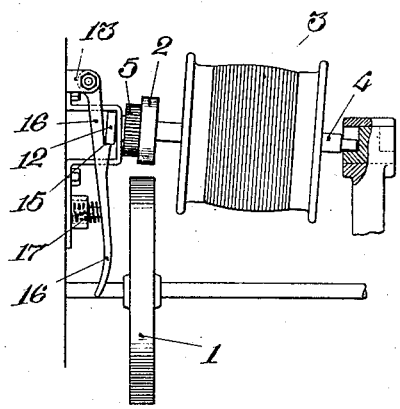

1,994,106

UNITED STATES PATENT OFFICE 1,994,106

AUTOMATIC REELING MACHINE

Isoji Kowada, Kyoto-Fu, Japan

Original application January 12, 1932, Serial No. 586,215. Divided and this application March 12, 1934, Serial No. 715,201

2 Claims. (Cl. 242—36)

This invention has reference generally to improvements in automatic stopping mechanisms and more particularly to an improved device for automatically stopping the motion of a reeling frame.

The invention is a divisional of my co-pending application Serial Number 586,215 filed Jan. 12, 1932.

The object of this invention is to provide a device of the above character designed not only to stop the movement of a reeling frame rapidly and accurately but to also cause the reeling frame to reversely rotate by its reaction force when it stops thus relieving the tension of the thread and preventing snapping thereof.

As an additional and equally important object the invention contemplates the provision of manually operable resiliently controlled means for releasing the reeling frame after it has been stopped in order to permit the latter to easily return to an operative position.

Briefly stated the invention may be said to consist of a constantly rotating large friction wheel carried by the shaft of the reeling frame, means being provided for movably mounting one end of the shaft while co-operating therewith is a pawl and ratchet mechanism which is responsive to means actuated by a knot in the thread being wound to effect raising of the shaft and disengagement of the friction wheels.

More specific objects of the invention consists in the provision of a movably mounted lever in which is journalled one end of the reeling frame supporting shaft and a manually operable spring controlled check lever for holding the movable lever in a raised position subsequent to the operation of the pawl and ratchet mechanism.

Other objects as well as the nature, characteristic features and scope of the invention will be more readily apparent from the following description taken in connection with the accompanying drawings and pointed out in the claims forming a part of this specification.

The invention is clearly illustrated in the accompanying drawings, in which:—

Fig. 1 is a longitudinal sectional elevation of a portion of this device.

Fig. 2 is a partial sectional elevation showing the working condition of the reeling frame.

Fig. 3 is a longitudinal elevation of the reeling frame while at rest.

Fig. 4 is a part sectional elevation of the reeling frame in the same condition as in Fig. 3.

The construction and working of the different parts of the automatical stopping device of the reeling frame of this invention will be fully explained referring to the drawings as described above.

A constantly rotating wheel (1) is arranged to contact with a small friction wheel (2) so that the small wheel is rotated by frictional transmission from the larger wheel (1).

The friction wheel (2) is fixed to one end of a shaft (4) on which the reeling frame (3) is also mounted.

Adjacent the smaller friction wheel (2), and on the same axis, a ratchet wheel (5) is fixed which engages with a pawl (6) on one end of a bell-crank lever (7) said pawl (6) permitting or stopping the rotation of the ratchet wheel (5).

The bell-crank lever (7) is connected by a connecting rod (8) to the rear end of a sustaining lever (9) which carries the knot remover (9') at its other end.

On one side of the bell-crank lever (7), counterweight (10) is arranged so as to keep balance.

When the knot remover (9') works without any interference, the lever (9) and connecting rod (8) will be pulled up and the pawl (6) will not engage with the ratchet wheel (5) and thus normal operation is attained.

The ratchet wheel (5) and the reeling frame shaft (4) is supported at an intermediate point on a rocking lever (12). The lever (12) may rock about its pivot (11), but still allows the winding wheel to rotate and the supporter (14) is pivoted on the frame (13), so as to receive therein one end of the rocking lever (12) and to limit the rocking sphere of the lever.

Adjoining the side of the rocking lever (12), a check rod (16) having a sloping side and a step (15) is pivoted to a frame (13). A spring (17) tends to push the check rod (16) toward the side of the reeling frame (3).

Now to explain the working of the same device, and referring to Fig. 1 and Fig. 2, when the threads passing through the knot remover (9') have comparatively larger knots and thereby pull up the knot remover (9') the rocking of the lever (9) will cause connecting rod (8) to move down whereby one arm of the bell-crank lever (7) will move down, rock the other arm and the pawl (6) will thus engage with the ratchet wheel (5) and stop suddenly the rotary motion of the reeling frame (3). In this case, the lever (12) with the reeling frame axis (4) will move up by the inertia of the rotation of the reeling frame and the lever (12) is lifted up and retained in position by the step (15) of the check rod (16), consequently the smaller friction wheel (2) is disconnected with the larger wheel (1). By the reaction of the shock caused by the movement of the rocking lever (12) and the upper part of the supporter (14), the reeling frame (3) is made to have some reverse rotation, thus giving some relaxation to the reeling threads.

In order to return the reeling frame (3) into an operative position it is only necessary to push the check rod (16) against the tension of the spring, that is to the left side in the drawings (see Fig. 2 and Fig. 4). As a result the step (15) is disconnected from the rocking lever (12), and the shaft of the reeling frame (4) and the rocking lever (12) regains its former position in order to allow the larger and smaller wheels (1) (2) to come into contact with each other.

Having thus fully described the invention what is claimed and desired to be secured by Letters Patent is:

1. An automatic stopping mechanism for reeling frames including in combination main driving means, a rotatably mounted shaft actuated thereby, a reeling frame on said shaft on which a thread is wound, means for movably mounting one end of the shaft, a ratchet wheel on the shaft, an operably mounted pawl for cooperating with the ratchet wheel, a lever arrangement associated with the pawl and actuated by a knot in the thread being wound to cause the pawl to engage the ratchet wheel, the shock of the latter engagement causing a raising of the movably mounted end of the shaft and a stopping of the rotation thereof, and means for releasably holding the raised end of the shaft in a raised position.

2. An arrangement as claimed in claim 1, wherein the means for releasably holding the raised end of the shaft includes a resiliently mounted lever provided with a sloping side and a step.

ISOJI KOWADA.